United States Patent [19]

Nakadai et al.

[11] 3,914,436

[45] Oct. 21, 1975

[54] PROCESS FOR MANUFACTURING SOY SAUCE USING ENZYMATIC PREPARATION(S)

[75] Inventors: Tadanobu Nakadai; Seiichi Nasuno; Nobuyoshi Iguchi, all of Noda, Japan

[73] Assignee: Noda Institute For Scientific Research, Noda, Japan

[22] Filed: Dec. 11, 1973

[21] Appl. No.: 423,654

[30] Foreign Application Priority Data
Dec. 11, 1972 Japan.............................. 47-123388
Dec. 26, 1972 Japan.............................. 47-129550

[52] U.S. Cl.................................. 426/46; 426/589
[51] Int. Cl.²........................................ A23L 1/238
[58] Field of Search.............. 426/46, 50, 60, 62, 63

[56] References Cited
UNITED STATES PATENTS
2,107,133  2/1938  Snelling................................ 426/46
3,495,991  2/1970  Mogi et al.............................. 426/46
3,711,303  1/1973  Luksas et al........................... 426/46
3,764,708  10/1973  Aonuma et al......................... 426/46

*Primary Examiner*—Jeanette M. Hunter
*Attorney, Agent, or Firm*—Schuyler, Birch, Swindler, McKie & Beckett

[57] ABSTRACT

Soy sauce manufactured by using enzymatic preparation(s) without changing the raw materials for soy sauce to koji by mixing an aqueous sodium chloride solution and enzymatic preparation(s) with said raw materials, and incubating the resultant mixture to subject to enzymatic action, fermentation and aging. As enzymatic preparation(s), there are added 3,000 units or more of proteinases per gram of crude protein, 0.8 units or more of aminopeptidases per gram of crude protein, 4,000 units or more of $\alpha$-amylase per gram of starch and 60 units or more of carboxymethylcellulase per gram of crude cellulose; or there is added an enzymatic preparation obtained from yellow-green Aspergilli.

17 Claims, 1 Drawing Figure

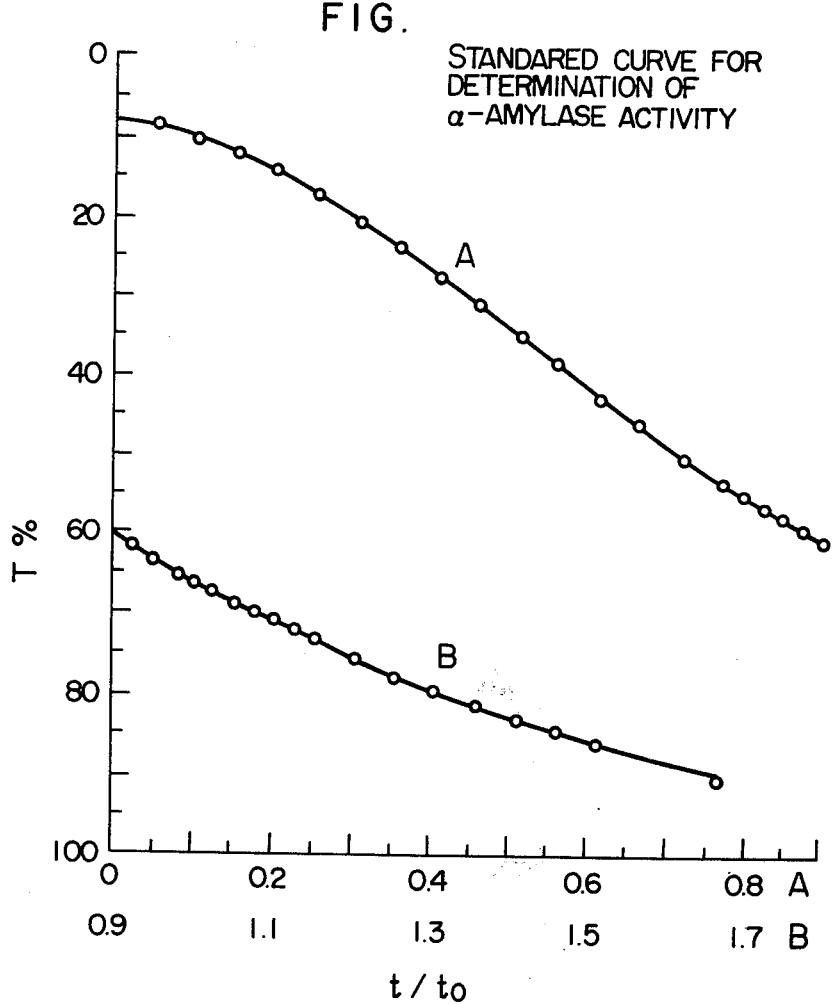

PROCESS FOR MANUFACTURING SOY SAUCE USING ENZYMATIC PREPARATION(S)

The present invention relates to a process for manufacturing soy sauce. More particularly, it relates to a process for manufacturing soy sauce by subjecting raw materials for soy sauce to enzymatic treatment without changing the raw materials to koji.

The figure shows the standard curve for determination of α-amylase activity.

Soy sauce is generally manufactured by inoculating a mixture of autoclaved soy bean and parched and crushed wheat with koji culture to make koji, mixing an appropriate amount of an aqueous sodium chloride solution with the resultant koji, and incubating the resultant mixture to subject the mixture to enzymatic action (hydrolysis of raw materials by the enzymes), fermentation and aging for the definite period of time.

If such a method as mentioned above is employed, however, there are problems that huge-scale facilities for manufacturing koji are needed due to changing the total amount of the raw materials for soy sauce to koji, that a long period of time is needed to manufacturing koji, that a strict control of temperature and humidity is requested in order to obtain koji having excellent and homogeneous quality, and that it is extremely difficult to prevent contamination of undesirable microorganisms in the course of manufacturing koji.

The present inventors have discovered, as a result of intensive studies aiming at manufacturing soy sauce from the raw materials for soy sauce by using enzymes alone without changing the materials to koji, findings that the essential enzymes for manufacturing soy sauce with enzymes are proteinases taking part in dissolving of protein in the raw materials, aminopeptidases taking part in the formation of amino acids, α-amylases participating in saccharification and carboxymethylcellulases being concerned in the viscosity of mash for soy sauce; and that soy sauce having an excellent quality equal to that of the soy sauce obtained by the conventional process can be manufactured by making these enzymes exist at a definite level of the activities. Moreover, the present inventors have discovered, as a result of conducting various studies on the mixing ratio of the raw materials in the case where soy sauce is manufactured by using enzymes alone as mentioned above, the finding that soy sauce having an excellent quality can be obtained by making the ratio by weight of the amyloidal raw materials to the proteinous raw materials smaller compared with that in the conventional process.

The present invention has been completed based on these findings.

An object of the present invention is to provide a process for manufacturing soy sauce using an enzymatic preparation or a mixture of enzymatic preparations without changing the raw materials for soy sauce to koji.

Another object of the present invention is to provide a process for manufacturing soy sauce using as an enzymatic preparation a crude enzymatic preparation obtained from a yellow-green Aspergillus in the above-mentioned process.

In addition, the present process has such various advantages as mentioned below.

1. Since the process for changing the raw materials for soy sauce to koji can be cut out according to the present process, facilities for manufacturing koji is unnecessary.

2. Since there is no fear of contamination of undesirable microorganisms when the present process is employed whereas there is a fear of the contamination of such microbes in the course of manufacturing koji according to the conventional process, there can be obtained soy sauce having a high purity and excellent quality according to the present process.

3. In the conventional process, that is, the one using koji manufactured from the raw materials for soy sauce, the ratio of wheat to soy bean is restricted to 1 : 1 due to manufacturing koji (koji having an excellent quality cannot be obtained since the control of water content in the raw materials becomes bad if the quantity of parched and crushed wheat is little, thereby the materials are easily subjected to microbial contamination). According to the present process, however, not only the mixing ratio of the raw material can be freely chosen in a wider range, but also at least the amount of amyloidal raw materials lost during manufacture of koji out of the total amount of amyloidal raw materials used in the conventional process can be saved.

4. The process for pressing mash according to the present process is easier and the amount of pressed residue becomes less as compared with the conventional process.

5. The formation of astrictive ammonium nitrogen in soy sauce according to the present process is about half of that according to the conventional process.

In the present process, if the proteinous materials are subjected to treatment for puffing, the formation and the speed for precipitation of sediment during pasteurizing is extremely rapid, as compared with those of the conventional process or those of the present process when used the materials denatured by the method other than puffing. Therefore, the period necessary for separating sediment can be shortened.

The present invention is a process for manufacturing soy sauce which is characterized by mixing an aqueous sodium chloride solution and an enzymatic preparation or a mixture of enzymatic preparations, more particularly, 3,000 units or more/1 g crude protein of proteinases, 0.8 units or more/1 g crude protein of aminopeptidases, 4,000 units or more/1 g starch of α-amylases and 60 units or more/1 g crude cellulose of carboxymethylcellulases with the proteinous and amyloidal raw materials for soy sauce denatured in the usual way, and incubating the resultant mixture to subject to enzymatic action (hydrolysis of raw materials by the enzymes), fermentation and aging.

The details of the present invention are given in the following description.

First of all, every material which is used in the ordinary process for manufacturing soy sauce can be used as a raw material for soy sauce according to the present process. For example, defatted soy bean, intact soy bean, gluten and the like can be used as a proteinous raw material and wheat and the like can be used as an amyloidal raw material. Additionally, purified protein [Prorich (a product of Ajinomoto Co., Ltd.), Fujipro (a product of Fuji Seiyu Co., Ltd.) and the like] and various starches, for example, corn starch, wheat starch, sweet potato starch and the like can be effectively used as proteinous and amyloidal raw materials, respectively.

Any treatment for denaturing proteinous material, if the treatment can make the material susceptible to the enzymatic action, may be employed. For example, in the case of defatted soy bean and intact soy bean, any ordinary method such as, for example, an autoclaving method such as N.K. type treatment method, flash autoclaving method under high pressure (see U.S. Pat. No. 3,647,484, Japanese Pat. publication No. 36198/71) and the like, alcohol denaturing method (see Japanese Pat. publication No. 18551/62), puffing method (see Japanese Pat. publication No. 34747/71) and, in the case of gluten, purified protein and the like, any ordinary method such as, for example, autoclaving method, alcohol-denaturing method and the like can be employed.

In the case of defatted soy bean and intact soy bean, it is preferred to use alcohol-denaturing method and puffing method, especially the latter.

N.K. type treatment method means the one comprising spraying 1–1.5 parts by weight of water to 1 part by weight of the proteinous raw materials to absorb water to said raw materials, passing through steam under an ordinary pressure for an appropriate time (usually, 30–40 minutes) to expose said raw materials thoroughly, subjecting to autoclaving under a pressure using saturated steam having a gauge pressure of 0.8–1.8 kg/cm$^2$ (temperature: 116°–131°C) for 20–80 minutes, (most usually using saturated steam having a gauge pressure of 1 kg/cm$^2$ for 40 minutes) and cooling the resultant product. However, in the case that intact soy bean is employed as it is, the intact soy bean should be soaked in advance in water of 10°–20°C for about 16 hours to swell it and the soaked soy bean is subjected to steam treatment as mentioned above without being sprayed with water.

Flash autoclaving method under a high pressure means the one comprising subjecting swelled and softened proteinous raw materials as mentioned above to autoclaving under a pressure using steam having a gauge pressure of 1.8 kg/cm$^2$ or more within 10 minutes and cooling the resultant rapidly.

Alcohol-denaturing method means the one comprising contacting proteinous raw materials without being sprayed with water to over-heated unsaturated vapor of lower alcohol or mixture of said vapor and over-heated steam under normal pressure at about 140°C or more.

For example, puffing of defatted soy bean or intact soy bean can be carried out by contacting defatted soy bean or intact soy bean to over-heated steam of 150°–170°C and 2–7 kg/cm$^2$ (gauge pressure) for 2–300 seconds and throwing out the resultant suddenly into the air. The water content of the thus puffed material is extremely low. Therefore, the stirring of soy sauce mash during the initial period after incubating the said material together with the amyloidal raw materials, enzymatic preparation, an aqueous sodium chloride solution and the like is very easy, so that the contamination with other microorganisms can readily be avoided, and the quality, especially the flavor of the obtained soy sauce, is very good, as compared with that of soy sauce obtained by using raw materials subjected to other denaturing methods (on the other hand, since the water content of the resultant is high when subjected defatted soy bean or intact soy bean to autoclaving method and the like, the stirring of the mash is relatively difficult due to soy bean paste-like property just after incubation). It is noteworthy that the amount of sediment during pasteurization is extremely little when used as a proteinous raw material puffed defatted soy bean, intact soy bean or the like, as compared with that of the other denaturing method.

As a denaturing method of amyloidal raw materials, the ordinary method such as, for example, parching method for wheat, autoclaving method for various starches can be used.

The subsequent description is given to explain enzymatic preparation employed in the present process.

As a proteinase, any commercially available enzymatic preparation such as, for example, Protease (Nutritional Biochemicals Corp. U.S.A.), Starzyme P (Universal Foods Corp., Asp. oryzae), Protease HT (Miles Lab., Inc. U.S.A., Asp. oryzae), Fungal Protease (Miles Lab., Inc. U.S.A., Asp. oryzae), Rhozyme W-15, P-11, B-6 (Rohm & Haas, Asp. parasticus), Meat Tenderizer (Adolf, Aspergillus), Pronase (Kaken Kagaku Co., Ltd., Streptomyces griseus), Prozyme (Kyowa Hakko Kogyo Co., Ltd., Streptomyces), Spitase F (Nagase Sangyo Co., Ltd., Bacillus subtilis), Nagarse (Nagase Sangyo Co., Ltd., Bacillus subtilis), Bioprase (Nagase Sangyo Co., Ltd., Bacillus subtilis), Protease Amano (Amano Seiyaku Co., Ltd., Bacillus), Proteoliquifase (Ueda Kagaku Kogyo Co., Ltd., Bacillus subtilis), Bakpro (Ueda Kagaku Kogyo Co., Ltd., Bacillus subtilis), Prolisin (Ueda Kagaku Kogyo Co., Ltd., Bacillus), Thermolysin (Seikagaku Fine Biochemicals Co., Ltd., Bacillus thermoproteolyticus Rokko), Alkaline Proteinase I. B. subtilis (Seikagaku Fine Biochemicals Co., Ltd., Bacillus subtilis var. amylosacchariticus Fukumoto), Alkaline Proteinase II, B. subtilis (Seikagaku Fine Biochemicals Co., Ltd.), Protease (Tokyo Chemical Industry Co., Ltd.), Denapsin (Nagase Sangyo Co., Ltd., Aspergillus), Panprosin (Kinki Yakulto Co., Ltd., Aspergillus niger), Newlase (Amano Seiyaku Co., Ltd., Rhizopus), Rapitase (Takeda Chemical Industries, Ltd., Trametes sanguinia), Molsin (Seishin Pharmaceutical Co., Ltd., Asp. saitoi), Proctase (Meiji Seika Co., Ltd., Asp. niger var. macrosporus), Samilase M (Shin-nippon Kagaku Co., Ltd., Aspergillus), Takadiastase (Sankyo Co., Ltd., Aspergillus oryzae), Clalin S (sold by the Society of Brewing, Japan, Asp. oryzae), Biozyme A (Amano Seiyaku Co., Ltd., Asp. oryzae), Purozaimu (Amano Seiyaku Co., Ltd., Aspergillus) and the like or any proteinase preparation obtained from proteinase-producing microorganisms, that is, yellow-green Aspergilli and the like such as, for example, Aspergillus sojae 1-112 (FERM-P No. 504, ATCC 20387), Aspergillus sojae 1-190 (FERM-P No. 505, ATCC 20388), Aspergillus oryzae IAM-2616, Aspergillus oryzae 460 (FERM-P No. 1149, ATCC 20386) and the like can be effectively used. Among these proteinase preparations, the ones from yellow-green Aspergilli origin are especially preferable.

As an aminopeptidase, any commercially available aminopeptidase preparation such as, for example, Leucine aminopeptidase (Nutritional Biochemicals Corp., U.S.A., hog kidney), Aminopeptidase M (Nutritional Biochemicals Corp., U.S.A., hog kidney), Aminopeptidase (Miles Lab. Inc., Bacillus subtilis), Aminopeptidase, B. subtilis (Seikagaku Fine Biochemicals Co., Ltd., Bacillus subtilis var. amyloliquefaciens Fukumoto), Mixed Peptidase (Miles Lab. Inc., hog intestine), Aminopeptidase M (Rohm & Haas), Leucine Aminopeptidase (Miles Lab. Inc., hog kidney), Leucine Aminopeptidase (Boehringer Mannheim Corp., hog kidney), Leucine aminopeptidase (Sigma Chemical Co., hog kidney), Peptidase (Tokyo Chemical Industry Co., Ltd., hog intenstine), Purozaimu (Amano Seiyaku Co., Ltd., Aspergillus) Punchidase LP (Kinki Yakult Co., Ltd., Aspergillus oryzae) and the like or any aminopeptidase preparation obtained from aminopeptidase-producing microorganisms, that is, yellow-green Aspergilli or the like such as, for example, Aspergillus oryzae 460 (FERM-P No. 1149, ATCC 20386), Aspergillus sojae 1-112 (FERM-P No. 504, ATCC 20387), Aspergillus sojae 1-190 (FERM-P No. 505, ATCC 20388), Aspergillus oryzae IAM 2616 can be effectively used. Among these aminopeptidase preparations, the ones from yellow-green Aspergilli origin are especially preferable.

As an α-amylase, any commercially available α-amylase such as, for example, Rhozyme P-11, SF 22 (Rohm & Haas, Aspergillus), Fungal Amylase (Miles Lab., Aspergillus), Starzyme A (Universal Foods Corp., Aspergillus), Fermex (Wallerstein Lab., Aspergillus), Mylase 100 (Wallerstein Lab., Aspergillus), Hydralase (Jacque Wolf, Aspergillus), Dextrinase (Miles Lab. Aspergillus), Clarlase (Miles Lab., Aspergillus), Rhozyme Dx (Rohm & Haas, Bacillus subtilis), Bacterial Amylase Rapidase (Wallerstein Lab., Bacillus subtilis), Spitase CP-1 (Nagase Sangyo Co., Ltd., Bacillus subtilis), Neospitase (Nagase Sangyo Co., Ltd., Bacillus subtilis), Biotex (Nagase Sangyo Co., Ltd., Bacillus subtilis), Neomalt (Daiwa Kasei Co., Ltd., Bacillus subtilis), Sunstarse (Daiwa Kasei Co., Ltd., Bacillus subtilis), Orientase (Oriental Kobo Co., Ltd., Bacillus subtilis), Punchyme (Sankyo Co., Ltd., Aspergillus oryzae), Sanzyme MM (Sankyo Co., Ltd., Aspergillus oryzae), Gluczyme (Amano Seiyaku Co., Ltd., Rhizopus niveus), Glutase (sold by Hankyu Kyoei Busan Co., Ltd., Rhizopus niveus), Smizyme (Shin-nippon Kagaku Co., Ltd., Rhizopus niveus), Matsulase (Matsutani Kagaku Co., Ltd., Endomycopsis), Stalase (Seishin Pharmaceutical Co., Ltd.), Biozyme K (Nagase Sangyo Co., Ltd.), Biozyme C (Nagase Sangyo Co., Ltd.) or the like and any α-amylase preparation obtained from α-amylase-producing microorganisms, that is, Aspergillus and the like such as, for example, Aspergillus oryzae 460 (FERM-P No. 1149, ATCC 20386), Aspergillus sojae 1-112 (FERM-P No. 504, ATCC 20387), Aspergillus sojae 1-190 (FERM-P No. 505, ATCC 20388), Aspergillus oryzae IAM 2616, Aspergillus saitoi (ATCC 14332), Aspergillus awamori (ATCC 14335) can be effectively used. Among these α-amylase preparations, the yellow-green or black Aspergilli origin ones are especially preferable.

As a carboxymethylcellulase, any commercially available carboxymethylcellulase such as, for example, Cellulase 1000 (Wallerstein Lab., Asp. niger), Cellulase 4000 (Miles Labs., Asp. niger), Hemicellulase CE-1000 (Miles Lab., Myrothecium), Meicelase (Meiji Seika Co., Ltd., Trichoderma viride), Cellulase Onozuka (Kinki Yakult Co., Ltd., Tricoderma viride), Cellulosin A.P. (Ueda Kagaku Co., Ltd., Aspergillus niger), Macerozyme (Kinki Yakult Co., Ltd., Rhizopus), A-12 (Takeda Chemical Industries, Ltd., Trametes sunginea), Colonase S (Wakamoto Seiyaku Co., Ltd., Rhizopus delemar WR 35) or the like and any carboxymethylcellulase preparation obtained from carboxymethylcellulase-producing microorganisms, that is, Aspergillus and the like such as, for example, Aspergillus oryzae 460 (FERM-P No. 1149, ATCC 20386), Aspergillus sojae 1-112 (FERM-P No. 504, ATCC 20387), Aspergillus sojae 1-190 (FERM-P No. 505, ATCC 20388), Aspergillus oryzae IAM 2616, Aspergillus saitoi (ATCC 14332), Aspergillus awamori (ATCC 14335) or the like can be effectively used. Among these carboxymethylcellulase preparations, the yellow-green or black Aspergilli origin ones are especially preferable.

Since enzymatic preparations obtained by collecting the most of all enzymes without isolation and purification from yellow-green Aspergilli, that is, crude enzymatic preparations contain all the essential enzymes as mentioned above, it is preferred to use a crude enzymatic preparation of said yellow-green Aspergilli in the present invention.

The term "crude enzymatic preparation of yellow-green Aspergilli" may include any enzymatic preparations obtained by alcohol precipitation method, salting out method with ammonium sulfate or the like, ultrafiltration method or the like.

As yellow-green Aspergilli from which the crude enzymatic preparation is obtained, Aspergillus oryzae, Aspergillus sojae, Aspergillus flavus, Aspergillus parasiticus, Aspergillus tamarii, Aspergillus clavatoflavus, Aspergillus zonatus, Aspergillus flavofurcatis, Aspergillus subolivaceus, Aspergillus avenaceus and the like can be included. Specially Aspergillus oryzae and Aspergillus sojae are preferable.

The typical examples of strains belonging to said species are Aspergillus oryzae 460 (FERM-P No. 1149, ATCC 20386), Aspergillus oryzae IAM 2616, Aspergillus sojae 1-112 (FERM-P No. 504, ATCC 20387), Aspergillus sojae 1-190 (FERM-P No. 505, ATCC 20388), Aspergillus flavus IFO 5324, Aspergillus parasiticus IFO 4204, Aspergillus tamarii IFO 4359 and the like, but not limited to those species or strains. That is, there can be also used any crude enzymatic preparations obtained from any microorganisms belonging to yellow-green Aspergilli such as, for example, the varieties, mutant species, mutant strains thereof.

It is preferred to use a crude enzymatic preparation obtained from yellow-green Aspergilli cultured in a solid medium, and, when used the ones obtained from yellow-green Aspergilli cultured in a liquid medium, it is better to use a mixture with that obtained from the yellow-green Aspergilli cultured in a solid medium.

When the cultivation of the yellow-green Aspergilli in a solid medium is carried out, the medium is prepared by spraying 70–100%, preferably, 80 % by weight of water to an appropriate solid medium such as wheat bran and autoclaving the resultant using steam having a pressure of 0–2 kg/cm² (gauge pressure). In this case, there may be added, if necessary, inorganic salts such as a calcium salt, a magnesium salt, a zinc salt, sodium nitrate, calcium nitrate, disodium phosphate and the like or other nutrient sources such as soy bean, rice bran, rape cake and urea. To the solid medium is inoculated the seed of yellow-green Aspergill and the culturing is conducted at 25°–40°C, preferably 30°C, for 40–60 hours, preferably 60 hours to obtain a solid cultured material.

When the cultivation of the yellow-green Aspergill is carried out in a liquid medium, the medium can be prepared by adding water to wheat bran, rice bran rape cake or mixtures of those materials so as to make the concentration of said materials 1–5 % by weigh and subjecting the resultant to sterilization at a pres sure of 0-2 kg/cm² (gauge pressure) for 10-60 minutes. To the sterilized medium is inoculated the seed of the yellow-green Aspergilli and the culturing is conducted at 25°-40°C for 40-60 hours, preferably at 30°C for 60 hours with aeration to obtain the cultured material.

The crude enzymatic preparation can be collected in the following manner from the thus obtained cultured materials. In the case of solid culture, to the cultured medium are added 2-5 times the quantity of water (4°-30°C). After being stirred or allowed to stand for 2-10 hours, the resultant mixture is filtered to obtain the filtrate. In the case of liquid culture, the cultured material is filtered to obtain the filtrate. The crude enzymatic preparation is obtained by a method, so called, "alcohol precipitation method", comprising adding 2-4 times, preferably, 3-4 times the volume of cold alcohol or cold acetone (e.g., 4°C) to the thus obtained filtrate and allowing to stand over night or so called "ammonium sulfate salting out method" comprising adding solid ammonium sulfate to the thus obtained filtrate so as to make the concentration of ammonium sulfate to 60-100 % saturation; collecting and lyophilizing the precipitates and then crushing the lyophilized precipitates. The alcohol precipitation method is especially preferable as a method for obtaining the crude enzymatic preparation.

There is given in the following the amount of the said essential enzymes to be added to the raw materials for soy sauce: In order to manufacture soy sauce having the same quality as that of the conventional method, it is quite essential to add 3,000 units or more of proteinases (hereinafter referred to as Pase) per gram of crude protein contained in the raw materials, 0.8 units or more of aminopeptidases (hereinafter referred to as APase) per gram of crude protein contained in the raw materials, 4,000 units or more of α-amylases (hereinafter referred to as Aase) per gram of starch contained in the raw materials and 60 units or more of carboxymethylcellulases (hereinafter refered to as CMCase) per gram of crude cellulose contained in the raw materials. If the activity of any said enzyme is lower than the above-mentioned value, soy sauce having an excellent quality cannot be obtained.

The activity of said enzymes are determined in the method given below.

To the given amount of the enzymatic preparation is added water to dissolve it. After being dialyzed with deionized water over night to desalt, the resultant is filled up to the given volume with water to obtain the enzymatic solution for determining the enzymatic activity.

1. Pase (Modified Anson's method)

To 1 g of milk casein (obtained according to Hammarsten's method) are added 80 ml of 0.1 mole/l disodium phosphate solution and the resultant is heated at 100°C for 5 minutes to dissolve said milk casein. After cooling the solution, the pH of the solution is adjusted to 7.0 with 1N HCl solution and filled up to the 200 ml level. The thus prepared solution is used as a substrate. Ten μl of the enzymatic solution are added to 2 ml of the substrate and the resultant is subjected to reaction for 10 minutes. To the resultant solution are added 2 ml of precipitating agent B (Modified Hagiwara's method) containing 0.1 mole/l trichloroacetic acid, 0.2 mole/l sodium acetate and 0.3 mole/l acetic acid to stop the reaction. After allowing to stand at 30°C for 30 minutes, the resultant solution is filtered using a filtering paper No. 5c (a product of Toyo Roshi Kaisha Ltd.). To 1 ml of the thus obtained filtrate are added 5 ml of 0.4 mole/l sodium carbonate and 1 ml of phenol reagent (a product of Daiichi Pure Chemical Co., Ltd.) diluted five times with water and the resultant solution is allowed to stand at 30°C for 30 minutes. Thereafter, the absorbance (O.D.) found at 666 mμ is determined.

On the other hand, to 10 μl of the enzymatic solution is added 2 ml of the precipitating agent B to inactivate the enzyme as the blank test. Thereafter, 2 ml of the said substrate is added to the resultant solution and the solution containing the substrate is allowed to stand at 30°C for 30 minutes. The resultant solution is filtered using filtering paper No. 5c. Thereafter, the absorbance (O.D.) of the blank test is determined in the same manner as mentioned above.

The activity of Pase is calculated according to the following equation with treating as one unit the amount of the enzyme which causes the color development corresponding to 1 μg of tyrosine for 1 minute under the above-mentioned condition.

Unit of Pase/1 ml of the enzymatic solution $$= \Delta \text{ O.D.} \times 120 \times \frac{4}{1} \times \frac{1.000}{10} \times \frac{1}{10} = \Delta \text{ O.D.} \times 4,800$$

where, $\Delta$ O.D. = Found O.D. − Blank O.D.

2. APase

To 1 ml of 0.05 mole/l phosphate buffer solution containing 2.5×10⁻⁴ mole/l of leucyl-glycyl-glycine (substrate, a product of Protein Research Foundation) is added 50 μl of the enzymatic solution to subject to reaction at 30°C for 30 minutes and then 0.5 ml of ninhydrin solution is added thereto. The resultant is heated at 100°C for 15 minutes. After cooling, 5 ml of 5 : 4 mixture of 0.1 mole/l disodium phosphate solution and acetone are added thereto and the absorbance (Found O.D. value) at 570 mμ is determined. On the other hand, the absorbance of the enzymatic solution whose enzymatic activity is inactivated by adding ninhydrin reagent is determined. The thus determined O.D. value is used as the one of the blank test.

The ninhydrin solution means the one whose appearance has been changed to red by mixing just before using solution A obtained by dissolving 1 g of ninhydrin in 25 ml of methylcellosolve and solution B which is an admixture of 0.5 ml of 0.01 mole/l potassium cyanide, 4.5 ml of methylcellosolve and 20 ml of 2 mole/l acetate buffer solution (pH 5.0) obtained according to Rosen's method.

The activity of APase is calculated according to the following equation with treating as one unit the amount of the enzyme capable of liberating 1μ mole of amino acid for 1 minute under the above-mentioned condition.

Unit of APase/1 ml of enzymatic solution $$= \Delta \text{ O.D.} \times 0.337 \times \frac{1,000}{50} \times \frac{1}{30} = \Delta \text{ O.D.} \times 0.224$$

where, $\Delta$ O.D. = Found O.D. − Blank O.D.

3. Aase (Modified Adachi's method)

To 10 ml of a 1 % soluble starch solution as the substrate are added 2 ml of 0.1 mole/l acetate buffer solution and 0.5 ml of the enzymatic solution. The resultant solution is subjected to reaction for 10 minutes at 40°C and then 0.2 ml of the reaction mixture is added to 10 ml of 2.5×10⁻⁴ mole/l iodine-potassium iodide solution containing 0.05 % HCl. T % at 660 mμ of the thus obtained solution is determined and $t/to$ is read from the standard curve for determining the Aase activity shown in FIGURE. The activity is calculated according to the following equation:

Unit of Aase/1 ml of enzymatic solution $$= t/to \times \frac{12.5}{0.2} \times \frac{1}{0.5} \times \frac{\frac{1}{10}}{60} = t/to \times 7{,}500$$

4. CMCase

One gram of carboxymethylcellulose (CMC) is dissolved in 100 ml of 0.1 mole/l acetate buffer solution (pH 5.0) and then the pH of the solution is adjusted to 5.0 by using 1N-HCl solution. This solution is used as the substrate. One ml of the enzymatic solution is added to 1 ml of this substrate and the resultant solution is subjected to reaction for 20 minutes at 40°C. Two ml of 3,5-dinitrosalicylic acid solution is added to the reaction solution and then the solution is heated at 100°C for 5 minutes. After cooling, 10 ml of water is added to the resultant to determine the absorbance (O.D.; Found) at 530 mμ. On the other hand, the absorbance of the reaction mixture using the enzymatic solution whose activity is inactivated by adding 3,5-dinitrosalicylic acid solution is determined in the same manner as described above. This O.D. value is used as a blank test value.

The 3,5-dinitrosalicylic acid solution is obtained by adding mixture solution (B) prepared by mixing 6.9 g of sodium bicarbonate with 69 ml of a solution containing 22 ml of 10 % sodium hydroxide solution and 10 g of phenol in 100 ml thereof to mixture solution (A) composed of 300 ml of 4.5 % sodium hydroxide aqueous solution, 880 ml of 1 % 3,5-dinitrosalicylic acid solution and 225 g of Rochelle salt and filtering after allowing to stand the resultant mixture over two nights (Sumner's method).

The activity of CMCase is calculated according to the following equation with treating as one unit the amount of the enzyme which causes color development corresponding to 1 mg of glucose for 1 hour under the above-mentioned condition.

Unit of CMCase/1 ml of the enzymatic solution $$= \Delta \text{O.D.} \times 1.13 \times \frac{60}{20} = \Delta \text{O.D.} \times 3.39$$

where, $\Delta$ O.D. = Found O.D. − Blank O.D.

There have been conducted various studies on the necessary activities of the said four enzymes against the raw materials for soy sauce when soy sauce is manufactured by using enzymatic preparations or a mixture thereof. The results thereof are described in the following experimental examples.

In the following experimental examples, there were used puffed defatted soy bean obtained by contacting defatted soy beans (crude protein: 47.8 %, starch: 10.1 %, crude cellulose: 5.1 %, water content 11.6 %) with over-heated steam of 165°C at a pressure of 6 kg/cm² (gauge pressure) for 5 seconds and throwing out the soy bean quickly into the air and a material obtained by parching wheat (crude protein: 10.7 %, starch: 68.4 %, crude cellulose: 1.8 %, water content: 11.1 %) and crushing the parched wheat are used as proteinous and amyloidal raw materials for the soy sauce.

The percentage of analytical value of starting materials as hereinbefore and hereinafter described means weight %.

The analysis of raw materials in the following experimental examples A to F and Examples was conducted according to the method described in JIKKEN NOGEI KAGAKU (Experiments in Agricultural Chemistry) Vol. 1, Page 112 (1963) (edited by Laboratories of Agricultural Chemistry, Faculty of Agriculture, Tokyo University, published by ASAKURA SHOTEN) and the analysis of the soy sauce was conducted according to the method described in "Shoyu" (soy sauce) by Isao UMEDA [Sankyo Shuppan Co., Ltd., (1961)].

EXPERIMENTAL EXAMPLE A

Amount of Pase to be added

To a mixture of 12.7 g of puffed defatted soy bean (the weight being just before subjecting to puffing treatment) and 5.9 g of parched and crushed wheat (the weight being just before subjecting to parching treatment) were added 50 ml of water, 10 g of sodium chloride and the given amounts of a commercially available Pase preparation (pure product), Alkaline protease I. B. Subtilis (762 units/mg of enzymatic preparation) so as to make the activities the levels shown in Table 1, respectively. The resultant solutions were subjected to hydrolysis for three months at 30°C. The analytical results of the filtrates are given in Table 1. The amount of crude protein in the raw material was 6.70 g.

Table 1

| Unit of Pase per gram of crude protein | 1,000 | 2,000 | 3,000 | 4,000 | 5,000 | 6,000 | 8,000 | 10,000 |
|---|---|---|---|---|---|---|---|---|
| Sodium chloride (%) | 17.02 | 17.04 | 17.05 | 17.04 | 17.07 | 17.03 | 17.05 | 17.02 |
| Total nitrogen (%) | 1.108 | 1.204 | 1.377 | 1.447 | 1.510 | 1.682 | 1.741 | 1.807 |
| Nitrogen utility (%) | 56.1 | 60.8 | 69.6 | 73.2 | 76.5 | 85.2 | 88.1 | 91.5 |

The percentage of sodium chloride and total nitrogen as hereinbefore and hereinafter described means weight/volume %.

As can be seen from the results shown in Table 1, the nitrogen utility is extremely low when the unit of Pase per gram of crude protein is lower than 3,000 (If the nitrogen utility is very low, the amounts of sediment and pressed residue increase).

Therefore, it is recognized that 3,000 units or more Pase per gram of crude protein, preferably, 6,000 units or more Pase per gram of crude protein, are needed.

EXPERIMENTAL EXAMPLE B

Amount of APase to be added

The hydrolysis was repeated in the same manner as described in Experimental Example A except that 10,000 units of Pase per gram of crude protein were employed and the given amounts of a commercially available APase preparation, "Aminopeptidase, B. subtilis", in pure form (0.454 units/mg of the enzymatic preparation) were added, respectively, so as to make the activities in the levels shown in Table 2. The analytical results of the filtrates are given in Table 2.

Table 2

| Unit of APase per gram of crude protein | 0.4 | 0.8 | 1.2 | 1.6 | 2.0 | 2.4 | 3.2 | 4.0 |
|---|---|---|---|---|---|---|---|---|
| Total nitrogen (%) | 1.702 | 1.711 | 1.723 | 1.737 | 1.744 | 1.752 | 1.760 | 1.761 |
| Formol nitrogen (%) | 0.480 | 0.582 | 0.640 | 0.695 | 0.741 | 0.847 | 0.875 | 0.908 |
| Glutamic acid (%) | 0.346 | 0.535 | 0.585 | 0.658 | 0.720 | 0.834 | 1.024 | 1.260 |
| Formol nitrogen / Total nitrogen (%) | 28.2 | 34.0 | 38.3 | 40.0 | 42.4 | 47.4 | 49.8 | 51.5 |
| Glutamic acid / Total nitrogen* | 0.203 | 0.310 | 0.340 | 0.379 | 0.414 | 0.476 | 0.583 | 0.715 |
| Palatability** | 1 | 2 | 2 | 2 | 3 | 3 | 3 | 3 |

*Shown in % of glutamic acid to 1% of total nitrogen.
**Judged by a panel comprising 10 skilled persons (1: Bad, 2: Normal, 3: Excellent).

The percentage of analytical value of formol nitrogen and glutamic acid as hereinbefore and hereinafter described means weight/volume %.

Generally speaking, the palatability of soy sauce becomes worse when the ratio of formol nitrogen to total nitrogen is below 30 % and the content of glutamic acid is less than 0.3 % per 1 % of the total nitrogen.

Judging from the above-mentioned viewpoints, it is recognized from Table 2 that 0.8 unit or more, preferably 2.0 units or more, of APase per gram of crude protein is needed.

EXPERIMENTAL EXAMPLE C

Amount of Aase to be added

The hydrolysis was repeated in the same manner as described in Experimental Example B except that 4 units of APase per gram of crude protein were employed and the given amounts of a commercially available Aase preparation, "Spitase CP-1", (268 units/mg of the enzymatic preparation) were added so as to make the activity thereof in the levels shown in Table 3, respectively. A half milliliter of the cultured broth of a soy sauce yeast, Saccharomyces rouxii m.3 (ATCC 13356), was added thereto 15 days after the beginning of incubation. The incubation was continued to subject to enzymatic action, fermentation and aging for 3 months from the beginning of incubation. The analytical results of the resulting filtrates are given in Table 3. The total starch in the raw material was 5.31 g.

The percentage of analytical value of reducing sugar

Table 3

| Unit of Aase per gram of starch | 1,000 | 2,000 | 3,000 | 4,000 | 5,000 | 6,000 | 8,000 | 10,000 |
|---|---|---|---|---|---|---|---|---|
| Reducing sugar (%) | 0.50 | 0.72 | 1.26 | 2.03 | 2.59 | 3.01 | 3.52 | 4.14 |
| Alcohol (%) | 0.49 | 0.71 | 0.92 | 1.12 | 1.38 | 1.64 | 1.81 | 2.09 |
| Flavor* | 1 | 1 | 1 | 2 | 2 | 2 | 3 | 3 |

*Judged by a panel comprising 10 skilled persons (1: Bad, 2: Normal, 3: Excellent).

and alcohol as hereinbefore and hereinafter described means weight/volume %.

As shown in Table 3, the flavor is bad and the contents of the reducing sugar and alcohol are low if the unit of Aase per gram of starch is lower than 4,000. Therefore, it is recognized that 4,000 units or more, preferably 8,000 units or more, of Aase per gram of starch are needed.

EXPERIMENTAL EXAMPLE D

Amount of CMCase to be added

To the mixture of puffed defatted soy bean (the weight of which before being puffed was 12.7 g) and parched and crushed materials of wheat (the weight of which before being parched was 5.9 g) were added 50 ml of water, 10 g of sodium chloride, 10,000 units of Pase as employed in Experimental Example A per gram of crude protein, 4 units of APase as employed in Experimental Example B per gram of crude protein and 10,000 units of Aase as employed in Experimental Example C per gram of starch. Additionally, the given amounts of a commercially available CMCase preparation, "Cellulosine AP", (0.226 units/mg of the enzymatic preparation) were added so as to make the activity to the levels shown in Table 4, respectively. The incubation was carried out to subjected to enzymatic action, fermentation and aging at 30°C for three months. During the incubation, 15 days after the beginning of incubation, 0.3 ml of the cultured broth of a soy sauce yeast, Saccharomyces rouxii m.3 (ATCC 13356), was added.

The viscosity of the thus obtained products was determined by using a rotary viscosity meter, Viscotester-VT-02 (a product of Rion Co., Ltd.). The results thereof are given in Table 4. (The determination of the viscosity in Experimental Example F and the following Examples was carried out by using this meter). The total amount of the crude cellulose in the raw material was 0.76 g.

Color (No.): Compared with standard color (sold by Nippon Shoyu Kenkyujo).

The percentage of analytical value of ammonium ni-

Table 4

| Unit of CMCase per gram of crude cellulose | 20 | 40 | 60 | 80 | 100 | 140 | 160 | 200 |
|---|---|---|---|---|---|---|---|---|
| Viscosity of mash for soy sauce (cP) | 6,000 | 5,000 | 4,000 | 3,200 | 2,100 | 1,800 | 1,400 | 1,000 |
| State of the mash* | 1 | 1 | 2 | 2 | 2 | 3 | 3 | 3 |

*1: Bad (Soy bean paste-like appearance), 2: normal, 3: Excellent

As shown in Table 4, when the unit of CMCase per gram of crude cellulose is lower than 60, the viscosity is high, the appearance of the mash is soy bean paste-like and it is extremely difficult to press. Therefore, it is recognized that 60 units or more, preferably 140 units or more, of CMCase per gram of crude cellulose are needed.

EXPERIMENTAL EXAMPLE E

1. To the mixture of puffed defatted soy bean whose weight before being subjected to puffing treatment was 12.7 g and parched and crushed wheat whose weight before being subjected to parching treatment was 5.9 g were added 50 ml of water, 10 g of sodium chloride and every enzyme used in Experimental Example D so as to make the activities of Pase, APase, Aase and CMCase 3,000 units per gram of crude protein, 0.8 units per gram of crude protein, 4,000 units per gram of starch and 60 units per gram of crude cellulose, respectively, which were the minimum necessary amount to be added in the present invention. The incubation was carried out to subject to enzymatic action, fermentation and aging at 30°C for three months. During the incubation, 15 days after the beginning of incubation, 0.1 ml of the cultured broth of the soy sauce yeast, Saccharomyces rouxii m.3 (ATCC 13356), was added.

2. The incubation was repeated to subject to enzymatic action, fermentation and aging in the same manner as described above except that Pase, APase, Aase and CMCase were added so as to make their activities 1,000 units per gram of crude protein, 0.4 units per gram of crude protein, 1,000 units per gram of starch and 20 units per gram of crude cellulose, respectively.

The test results including the analytical data of the components in soy sauce obtained according to the methods (1) and (2) are shown in Table 5.

trogen, amino nitrogen as hereinbefore and hereinafter described means weight/volume %.

It is recognized from the results in Table 5 that soy sauce can be obtained by method (1), but cannot be obtained by method (2).

When a crude enzymatic preparation obtained from yellow-green Aspergilli cultured in a solid medium is employed, the amount to be added may be the one which can satisfy the respective necessary activities of the said essential enzymes. Usually, the necessary activities of said essential enzymes can be satisfied by adding 1–20 % by weight of the crude preparation to the weight of the raw materials (total weights of proteinous raw materials and amyloidal raw materials). When a crude enzymatic preparation obtained from yellow-green Aspergilli cultured in a liquid medium is employed, it is preferable to use a mixture with crude enzymatic preparations obtained from that cultured in a solid medium; said mixture is prepared by adding 1–4 times the weight of the crude enzymatic preparation obtained from that cultured in a solid medium.

In the present process, enzymes other than said four essential enzymes can be used. The examples of these are: carboxypeptidases which can increase the formation of amino acid, pectin-transeliminase which can decrease further the mash viscosity. The units of those enzymes are 1 unit or more, preferably 3 units or more, per gram of crude protein; 80 units or more, preferably 300 units or more, per gram of pectin, respectively. In addition to those, it is possible to add appropriate amount of glutaminase which can increase the formation of glutamic acid and asparaginase which can increase the formation of aspartic acid, S-amylase which can promote further sacchrification and the like, thereby soy sauce having excellent property can be obtained.

The determination of the activity of carboxypeptidase can be conducted in the same manner as that for Table 5

| | Sodium chloride (%) | Total nitrogen (%) | Formol nitrogen (%) | Ammonium nitrogen (%) | Amino nitrogen (%) | Glutamic acid (%) | Reducing sugars (%) |
|---|---|---|---|---|---|---|---|
| (1) | 17.05 | 1.385 | 0.586 | 0.113 | 0.473 | 0.538 | 2.08 |
| (2) | 17.04 | 1.111 | 0.482 | 0.117 | 0.365 | 0.342 | 0.54 |

| | Alcohol (%) | Total acids | Color (No.) | pH | Mash viscosity (cP) | Nitrogen utility (%) | Sensory evaluation test* |
|---|---|---|---|---|---|---|---|
| (1) | 1.18 | 1.92 | 370 | 4.92 | 3,900 | 69.8 | + |
| (2) | 0.52 | 1.52 | 310 | 5.01 | 5,800 | 56.3 | − |

*Sensory evaluation test was conducted by a panel comprising 10 skilled persons (−: Flavor and palatability were bad, +: Flavor and palatability were normal).

APase except that 1 ml of 0.05 mole/l acetate buffer solution (pH 3.0) containing $5 \times 10^{-4}$ mole/l of carbobenzoxy-glutamyl-tyrosine (a product of Protein Research Foundation) instead of leucyl-glycyl-glycine is used as a substrate. The determination of the activity of pectin-transeliminase can be conducted according to the method by Ishii et al. [Nippon Nogei Kagaku Kaishi Vol. 44, Page 299 (1970)].

The volume of an aqueous sodium chloride solution which is used together with the raw materials and enzymatic preparation is 2–5 times the weight of the raw materials before denaturation treatment. The concentration of sodium chloride in the aqueous solution to be used is adjusted so as to make the concentration of sodium chloride in fermented soy sauce 13–20 %, preferably 17 %.

As the way of charging, any charging method can be adopted, however, it is preferred to dissolve in advance the enzymatic preparation in an aqueous sodium chloride solution, admix the resultant solution with the denatured proteinous raw materials with stirring, add amyloidal raw materials thereto and then stir the resultant mixture.

After the charging is completed in such a manner as described above, incubation is carried out to subject the resultant mixture to enzymatic action, fermentation and aging at a temperature of 20°–40°C for 3–6 months, preferably at a temperature of 25°–30°C for 5 months. From 3 to 7 days after the beginning of incubation (that is, from 3 to 7 days after the charging), the mixing by stirring is conducted every day and thereafter the mixing is conducted weekly. If necessary, 20–40 days, preferably about 30 days after the beginning of incubation, there may be added a soy sauce yeast such as, for example, Saccharomyces rouxii m.3 (ATCC 13356) or the like and 7–20 days after the beginning of incubation, one or more types of soy sauce lactic acid bacteria such as, for example, Tetracoccus sojae (FERM-P No. 1401, ATCC 21787), Pediococcus halophilus (FERM-P No. 1414, ATCC 21786) and the like.

The thus fermented and aged mash is pressed and the raw soy sauce is pasteurized and the formed sediments are removed, thereby soy sauce having a comparable quality to that according to the conventional method can be obtained.

When soy sauce is manufactured according to the present process, there is obtained soy sauce superior in flavor, palatability and color if the denatured proteinous raw materials and amyloidal raw materials are used in such a quantity that the ratio of weight of amyloidal raw material to that of proteinous raw material before denaturing is within a range of 0.2–0.8. The following Experimental Example is given to explain this fact.

EXPERIMENTAL EXAMPLE F

To each 0.95 kg of puffed defatted soy bean obtained by contacting 1 kg of defatted soy bean to over-heated steam having a temperature of 164°C and a pressure of 6 kg/cm² (gauge pressure) for 5 seconds and throwing out the resultant quickly into the air was added the given amount of parched and crushed wheat so as to make the ratio of wheat weight to the defatted soy bean weight before denaturing to the levels shown in Table 6, respectively, and the enzymatic solution prepared by dissolving commercially available enzymes, Purozaimu, Biozyme K and Meicelase, at the rate of 100 g, 20 g and 50 g, respectively; and 0.84 kg of sodium chloride to 4.2 l of water was added thereto. The respective resultant mixtures were incubated at 30°C. Twenty days after the beginning of incubation, 3 ml of the cultured broth of soy sauce yeast, Saccharomyces rouxii m.3 (ATCC 13356) and then the incubation was continued to subject to enzymatic action, fermentation and aging for two months and the filtration was conducted to obtain the filtrates.

The analytical results of defatted soy bean were: 48.2 % of crude protein, 9.2 % of starch, 6.0 % of crude cellulose, 10.6 % of water and those of wheat were: 10.9 % of crude protein, 65.7 % of starch, 1.8 % of crude cellulose and 9.7 % of water. The respective activities of the commercially available enzymes employed herein are given in Table 7.

Table 7

| Enzyme | Activity of Pase | Activity of APase | Activity of Aase | Activity of CMCase |
| --- | --- | --- | --- | --- |
| Purozaimu | 126 | 0.0133 | 3.5 | 0.061 |
| Biozyme K | 1.71 | 0 | 762 | 0.330 |
| Meicelase | 0.71 | 0 | 224 | 0.275 |

Note: The respective activities are shown in the unit per mg of the respective enzymatic preparations.

The weights of the commercially available enzymes employed herein were constant as stated before and enough to meet the requirements. For example, in the case that the ratio of wheat weight to defatted soy bean weight is 1.0, Pase is contained at the rate of 42,800 units per gram of crude protein, APase is 2.25 units per gram of crude protein, Aase is 17,500 units per gram of starch and CMCase is 338 units per gram of crude cellulose.

The test results including the analytical data of each component contained in the thus obtained filtrates and the results of sensory evaluation test thereof are given in Tables 8-1 and 8-2. In the column of sensory evaluation test, + denotes that the flavor and palatability are normal, ++ denotes that they are excellent and +++ denotes that they are extremely excellent. The sensory evaluation test was conducted by using a panel comprising 10 skilled persons.

Table 8-1

| Wt. of wheat / Wt. of defatted soy bean | Sodium chloride (%) | Total nitrogen (%) | Formol nitrogen (%) | Ammonium nitrogen (%) | Amino nitrogen (%) | Glutamic acid (%) | Reducing sugars (%) |
| --- | --- | --- | --- | --- | --- | --- | --- |
| 1 | 15.15 | 1.881 | 0.882 | 0.137 | 0.745 | 1.195 | 7.74 |
| 0.9 | 15.30 | 1.878 | 0.901 | 0.135 | 0.766 | 1.217 | 6.71 |
| 0.8 | 15.55 | 1.868 | 0.913 | 0.132 | 0.781 | 1.218 | 5.63 |
| 0.7 | 15.60 | 1.852 | 0.906 | 0.127 | 0.779 | 1.223 | 5.22 |

Table 8-1-Continued

| Wt. of wheat / Wt. of defatted soy bean | Sodium chloride (%) | Total nitrogen (%) | Formol nitrogen (%) | Ammonium nitrogen (%) | Amino nitrogen (%) | Glutamic acid (%) | Reducing sugars (%) |
|---|---|---|---|---|---|---|---|
| 0.6 | 15.70 | 1.823 | 0.895 | 0.113 | 0.782 | 1.227 | 4.97 |
| 0.5 | 15.70 | 1.775 | 9.902 | 0.112 | 0.790 | 1.152 | 4.35 |
| 0.4 | 15.95 | 1.773 | 0.894 | 0.111 | 0.783 | 1.180 | 2.48 |
| 0.3 | 16.40 | 1.802 | 0.902 | 0.103 | 0.709 | 1.231 | 2.17 |
| 0.2 | 16.40 | 1.712 | 0.875 | 0.096 | 0.779 | 1.102 | 1.78 |
| 0.1 | 16.60 | 1.698 | 0.872 | 0.092 | 0.780 | 1.205 | 1.74 |
| 0   | 16.60 | 1.678 | 0.863 | 0.088 | 0.775 | 1.103 | 0.51 |

Table 8-2

| Wt. of wheat / Wt. of defatted soy bean | Alcohol (%) | Total acids | Color (No.) | pH | Mash viscosity (cP) | Nitrogen utility (%) | Sensory evaluation test |
|---|---|---|---|---|---|---|---|
| 1   | 2.09 | 2.15 | 430 | 5.17 | 2,300 | 87.8 | + |
| 0.9 | 1.99 | 2.10 | 430 | 5.18 | 1,200 | 88.6 | + |
| 0.8 | 1.95 | 2.15 | 400 | 5.20 | 850 | 88.6 | ++ |
| 0.7 | 2.05 | 1.95 | 370 | 5.21 | 780 | 89.5 | ++ |
| 0.6 | 2.28 | 1.90 | 310 | 5.22 | 670 | 89.6 | ++ |
| 0.5 | 1.95 | 1.90 | 310 | 5.23 | 520 | 89.3 | +++ |
| 0.4 | 1.98 | 1.90 | 270 | 5.23 | 500 | 90.4 | +++ |
| 0.3 | 1.53 | 1.85 | 270 | 5.24 | 490 | 91.3 | ++ |
| 0.2 | 1.54 | 1.75 | 230 | 5.31 | 450 | 88.7 | ++ |
| 0.1 | 0.97 | 1.65 | 230 | 5.33 | 390 | 89.1 | + |
| 0   | 0.52 | 1.55 | 180 | 5.35 | 350 | 90.2 | + |

Soy sauce contains generally 2–5 % of reducing sugars and 1 % or more of alcohol. In addition to the contents of amino nitrogen, glutamic acid and the like, the color and the viscosity of mash are appropriate and there is important the well-balanced composition of the components put all those factors together, thereby the one having excellent flavor and palatability can be obtained.

As is clear from Tables 8-1 and 8-2, it is recognized judging from the above-mentioned viewpoints and the results of the sensory evaluation test that there can be obtained a mash having an excellent quality and soy sauce having an excellent quality when the raw materials whose ratio of amyloidal raw materials to proteinous raw materials is within a range of 0.2–0.8, preferably 0.4–0.5, is used.

According to the present process explained in detailed as above, there can be obtained soy sauce having the quality equal to the one obtained according to the conventional process.

The present invention is described by the following Examples, but not limited thereto.

EXAMPLE 1

To a mixture of puffed defatted soy bean prepared by contacting 127 kg of defatted soy bean (crude protein: 51.5 %, starch: 9.5 %, crude cellulose: 5.0 % and water content: 10.4 %) to over-heated steam having a temperature of 165°C and a pressure of 6 kg/cm² (gauge pressure) for 5 seconds and throwing out the resultant quickly in the air and denatured wheat obtained by parching 59 kg of wheat (crude protein: 10.7 %, starch: 68.4 %, crude cellulose: 1.7 % and water content: 11.1 %) and crushing the resultant wheat, were added 500 l of 21.6 % of aqueous sodium chloride solution and the given amounts of the commercially available enzymes shown in Table 9 and the resultant was incubated at 27°C.

Table 9

| Enzyme | Added amount (kg) | Activity of Pase | Activity of APase | Activity of Aase | Activity of CMCase |
|---|---|---|---|---|---|
| Purozaimu | 10 | 126 | 0.133 | 3.5 | 0.061 |
| Biozyme C | 1 | 0.156 | 0.000535 | 735 | 0.050 |
| Cellulosine AP | 3 | 0.43 | 0.000068 | 37.5 | 0.226 |

Note; The activities of the respective enzymes are shown by the unit per gram of the enzymatic preparations.

The activities of the respective enzymes to the raw materials were; Pase: 17,500 units per gram crude protein, APase: 2.55 units per gram of crude protein, Aase: 16,200 units per gram of starch and CMCase: 152 units per gram of crude cellulose.

Twenty days after the beginning of incubation, 2 l of the cultured broth of soy sauce yeast, Saccharomyces rouxii m.3 (ATCC 13356), were added thereto. The incubation was continued to subject to enzymatic action, fermentation and aging for further 4 months. After being pressed the resultant, 578 l of soy sauce having an excellent quality were obtained. The test results including the analytical data of the components in the thus obtained soy sauce are given in Table 10.

The reference soy sauce shown in Table 10 means the one obtained by denaturing 99 kg of defatted soy bean and 101 kg of wheat in the same manner as mentioned above, manufacturing koji from the mixture thereof in the usual way, adding 380 l of aqueous sodium chloride solution (25.5 %) to the thus obtained koji, and incubating the resultant mixture to subject to enzymatic action, fermentation and aging in the same manner as mentioned above.

Table 10

|  | Sodium chloride (%) | Total nitrogen (%) | Formol nitrogen (%) | Ammonium nitrogen (%) | Amino nitrogen (%) |
|---|---|---|---|---|---|
| Present soy sauce | 17.15 | 1.740 | 0.904 | 0.124 | 0.780 |
| Reference soy sauce | 18.00 | 1.794 | 1.077 | 0.302 | 0.775 |

|  | Glutamic acid (%) | Reducing sugars (%) | Alcohol (%) | Total acids | Color (No.) |
|---|---|---|---|---|---|
| Present soy sauce | 1.001 | 2.63 | 2.18 | 1.96 | 400 |
| Reference soy sauce | 1.337 | 3.48 | 0.80 | 2.35 | 500 |

|  | pH | Mash viscosity (cP) | Pressed residue (kg) | Nitrogen utility (%) | Turbidity (O.D.) |
|---|---|---|---|---|---|
| Present soy sauce | 5.19 | 1,700 | 40.6 | 90.6 | 0.024 |
| Reference soy sauce | 4.61 | 2,000 | 51.8 | 89.0 | 0.035 |

The turbidity was determined by using a turbidmeter (Model ANA-14S, a product of Tokyo Photoelectric Co., Ltd.) with VR-60 filter which can cut the wave less than 600 m$\mu$ (distance between sample and photoelectric cell: 4 cm) as to the supernatant obtained by heating at 80°C for 4 hours pressed soy sauce from the fermented mash, and allowing to stand for 13 hours at a room temperature. The turbidity in Table 10 is calculated by subtracting blank test value (O.D.) from every found value (O.D.). The turbidity in the following Examples was also determined in the same manner as mentioned above. The lower the O.D. value is, the more cleared the obtained soy sauce is. Therefore, it shows the fact that the sedimentation can be easily done.

EXAMPLE 2

To a mixture of denatured defatted soy bean meal prepared by treating 127 kg of defatted soy bean meal (crude protein: 45.3 %, starch: 9.8 %, crude cellulose: 5.1 % and water content: 13.2 %) in the same manner as described in Example 1 and denatured wheat prepared by treating 59 kg of the same wheat as used in Example 1 in the same manner as described in Example 1, were added 180 l of water, 340 l of 31.72 % aqueous sodium chloride solution, 7 kg of crude enzymatic preparation collected from a liquid koji of Aspergillus oryzae 460 (FERM-P No. 1149, ATCC 20386) according the method described below and 10 kg of a commercially available enzymatic preparation, "Stalase", to incubate at 27°C. One month after the beginning of incubation, 2 l of the cultured broth of soy sauce yeast, "Saccharomyces rouxii m.3 (ATCC 13356)", were added thereto and the incubation was continued to subject to enzymatic action, fermentation and aging for further 4 months. After being pressed the resultant, 628 l of soy sauce having an excellent quality was obtained.

The activities of the respective enzymatic preparations used are given in Table 11.

The crude enzymatic preparation from Aspergillus oryzae 460 (FERM-P No. 1149, ATCC 20386) was obtained as follows:

After 10 tons of a medium containing 2 % (W/V) of wheat bran and 0.5 % (W/V) of defatted soy bean were subjected to sterilization at a pressure of 2 kg/cm$^2$ (gauge pressure) for 30 minutes, the seed of Aspergillus oryzae 460 (FERM-P No. 1149, ATCC 20386) was inoculated and the resultant was cultured at 30°C for 96 hours. The cultured medium was filtered by a filter press to give, 8,810 l of the filtrate. The thus obtained filtrate was concentrated under a reduced pressure at 30°C to 1,650 l. To the concentrated filtrate was added 3 times the volume of cold alcohol to precipitate enzymatic preparations. The presipitate was collected and lyophilyzed to give 50 kg of the crude enzymatic preparation which was called as Y in Table 11.

Table 11

| Enzymatic preparation | Activity of Pase | Activity of APase | Activity of Aase | Activity of CMCase |
|---|---|---|---|---|
| Stalase | 1.10 | 0 | 141.2 | 0.105 |
| Y | 78.0 | 0.0912 | 16.5 | 0.069 |

Note: The activity of each enzyme is shown in the unit per gram of the enzymatic preparation.

The activity of each enzyme added to the raw materials was as follows; Pase: 8,720 units per gram of crude protein, APase: 9.98 units per gram of crude protein, Aase: 28,400 units per gram of starch and CMCase: 204 units per gram of crude cellulose.

The test results including the analytical data of the components in the resultant soy sauce are given in Table 12 wherein the reference soy sauce means the one obtained by denaturing 99 kg of defatted soy bean and 101 kg of wheat in the same manner as mentioned above, manufacturing koji from the mixture thereof, adding 380 l of 25.5 % aqueous sodium chloride solution to the resultant koji, and incubating the resultant mixture to subject to enzymatic action, fermentation and aging in the same manner as mentioned above.

Table 12

|  | Sodium chloride (%) | Total nitrogen (%) | Formol nitrogen (%) | Ammonium nitrogen (%) | Amino nitrogen (%) |
|---|---|---|---|---|---|
| Present soy sauce | 17.30 | 1.813 | 0.939 | 0.129 | 0.810 |
| Reference soy sauce | 17.05 | 1.829 | 1.136 | 0.270 | 0.866 |

|  | Glutamic acid (%) | Reducing sugars (%) | Alcohol (%) | Total acids | Color (No.) |
|---|---|---|---|---|---|
| Present soy sauce | 1.198 | 3.11 | 2.09 | 2.03 | 460 |
| Reference soy sauce | 1.491 | 2.55 | 2.19 | 1.91 | 310 |

|  | pH | Mash viscosity (cP) | Pressed residue (kg) | Nitrogen utility (%) | Turbidity (O.D.) |
|---|---|---|---|---|---|
| Present soy sauce | 5.21 | 1,500 | 38.9 | 91.5 | 0.030 |
| Reference soy sauce | 5.19 | 1,600 | 46.5 | 89.2 | 0.040 |

EXAMPLE 3

The denaturation of 127 kg of the same defatted soy beans and 59 kg of the same wheat as used in Example 1 was repeated in the same manner as mentioned in Example 1 and then the denatured defatted soy bean and wheat were mixed. Five hundred liters of 21.6 % aqueous sodium chloride solution was added to the mixture and to the resultant was added 20 kg of the crude enzymatic preparation collected from the wheat bran koji of Aspergillus sojae 1-112 (FERM-P No. 504, ATCC 20387) in the manner as described below to incubate at 27°C. There was obtained an excellent soy sauce in the same manner as mentioned in Example 1.

The activity of each enzyme per mg of the enzymatic preparation was as follows: Pase; 27.2 units, APase; 0.0034 unit, Aase; 70.3 units and CMCase; 0.066 unit. The activity of each enzymes added to the raw materials was as follows: Pase; 7,580 units per gram of crude protein, APase; 12.9 units per gram of crude protein, Aase; 26,700 units per gram of starch, and CMCase; 180 units per gram of crude cellulose.

The crude enzymatic preparation from Aspergillus sojae 1-112 (FERM-P No. 504, ATCC 20387) was obtained as follows:

To 1,260 kg of wheat bran was sprayed with 950 l of water and the resultant was subjected to steaming in the usual way. The seed of Aspergillus sojae 1-112 (FERM-P No. 504, ATCC 20387) was inoculated to incubate at 30°C for 60 hours. Thereafter, the enzymes were extracted by using water in the usual way to give 2,000 l of an enzymatic solution. To the enzymatic solution, was added 6,000 l of cold alcohol to make precipitate. The precipitate was collected and dryed to give 60 kg of the enzymatic preparation.

The test results including the analytical data of components in the thus obtained soy sauce are given in Table 13. The reference soy sauce was prepared in the same manner as mentioned in Example 1.

Table 13

|  | Sodium chloride (%) | Total nitrogen (%) | Formol nitrogen (%) | Ammonium nitrogen (%) | Amino nitrogen (%) |
|---|---|---|---|---|---|
| Present soy sauce | 17.35 | 1.784 | 1.025 | 0.290 | 0.735 |
| Reference soy sauce | 17.25 | 1.771 | 0.946 | 0.131 | 0.815 |

|  | Glutamic acid (%) | Reducing sugars (%) | Alcohol (%) | Total acids | Color (No.) |
|---|---|---|---|---|---|
| Present soy sauce | 1.371 | 2.81 | 1.76 | 2.08 | 540 |
| Reference soy sauce | 1.452 | 3.54 | 0.94 | 2.38 | 400 |

|  | pH | Mash viscosity (cP) | Pressed residue (kg) | Nitrogen utility (%) | Turbidity (O.D.) |
|---|---|---|---|---|---|
| Present soy sauce | 5.10 | 1,500 | 37.2 | 89.7 | 0.027 |
| Reference soy sauce | 4.71 | 2,000 | 50.9 | 88.3 | 0.035 |

EXAMPLE 4

To 1,260 kg of wheat bran was sprayed with 950 l of water and the resultant was subjected to steaming for 60 minutes at a pressure of 1 kg/cm$^2$ (gauge pressure). The seed of Aspergillus oryzae 460 (FERM-P No. 1149, ATCC 20386) was inoculated to the steamed medium. The incubation was conducted at 30°C for 60 hours to obtain koji. The enzymes contained in the koji was extracted with water in the usual way. To 2,000l of the thus obtained extract solution was added 6,000l of cold ethyl alcohol (4°C) and then the resultant was allowed to stand over night to separate precipitate formed. The precipitate was collected, lyophilized and crushed to obtain 50.3 kg of a crude enzymatic preparation.

The activity of each enzyme per mg of the crude enzymatic preparation was as follows: Pase; 45.4 units, APase; 0.0237 unit, Aase; 330 units, and CMCase; 0.883 unit.

To a mixture (total crude protein: 68.6 kg, total starch: 56.6 kg and total crude cellulose: 8.0 kg) pre- The reference soy sauce was obtained by manufacturing koji in the usual way from a mixture of 92 kg of puffed soy bean subjected to puffing treatment in the same manner as mentioned above and 93 kg of parched and crushed wheat, adding 380l of 25.5 % aqueous sodium chloride solution to the thus obtained koji (240 kg), and incubating the resultant mixture to subject to enzymatic action, fermentation and aging in the same manner as mentioned above.

Table 14

|  | Sodium chloride (%) | Total nitrogen (%) | Formol nitrogen (%) | Amino nitrogen (%) | Ammonium nitrogen (%) |
|---|---|---|---|---|---|
| Present soy sauce | 16.90 | 1.761 | 0.908 | 0.782 | 0.126 |
| Reference soy sauce | 17.15 | 1.844 | 1.153 | 0.882 | 0.271 |

|  | Total acids (%) | Reducing sugars (%) | Alcohol (%) | Glutamic acid (No.) | Color | pH |
|---|---|---|---|---|---|---|
| Present soy sauce | 2.63 | 2.60 | 1.76 | 1.260 | 460 | 5.05 |
| Reference soy sauce | 2.05 | 2.84 | 0.92 | 1.547 | 430 | 5.02 |

|  | Mash viscosity (cP) | Rate of raw soy sauce pressed % | Wt. of sediment (mg/100ml) | Wt. of pressed residue (g/100ml) | Nitrogen utility (%) | Turbidity (O.D.) |
|---|---|---|---|---|---|---|
| Present soy sauce | 900 | 97.4 | 142 | 5.82 | 91.6 | 0.024 |
| Reference soy sauce | 1,600 | 84.2 | 10 | 7.48 | 89.2 | 0.040 |

(1) The press rate of raw soy sauce is shown in the term of percent and the rate of the total volume of pressed liquid to the volume of mash for soy sauce and the weight of pressed residue show the one of pressed residue obtained from 100 ml of the mash.

(2) The weight of sediment is expressed in the term of mg per 100 ml of soy sauce, and the one of sediment collected by heating the raw soy sauce, centrifugint the heated soy sauce at 10,000 r.p.m. for 15 minutes to separate the sediment, washing the sediment with water three times and drying the washed sediment to weight.

pared in advance by adding 54 kg of denatured wheat obtained by parching and crushing 59 kg of wheat (crude protein: 14.2 %, starch: 74.1 %, crude cellulose: 2.7 % and water content: 10.1 %) to 120 kg of puffed defatted soy bean obtained by contacting 126 kg of defatted soy bean (crude protein: 47.8 %, starch: 10.2 %, crude cellulose: 5.1 % and water content: 11.6 %) to over-heated steam having a temperature of 164°C and a pressure of 6 kg/cm² (gauge pressure) for 5 seconds and throwing out the resultant quickly into the air, was added a mixed solution prepared by dissolving 10 kg of said enzymatic preparation to 180l of water and adding thereto 340l of 31.72 % aqueous sodium chloride solution to inoculate at 27°C. The activity of each enzyme added to the raw materials was as follows: Pase; 3,300 units per gram of crude protein, APase; 3.48 units per gram of crude protein, Aase; 58,400 units per gram of starch, and CMCase; 1,100 units per gram of crude cellulose.

One month after the beginning of incubation, 2l of the cultured broth of soy sauce yeast, "Saccharomyces rouxii m.3 (ATCC 13356)", was added thereto and the incubation was continued to subject to enzymatic action, fermentation and aging for further 4 months. The incubated mixture was pressed to obtain 623l of soy sauce having an excellent flavor and palatability.

The test results including the analytical data of the components in the soy sauce are shown in Table 14.

In the following Examples, the press rate of raw soy sauce and the weight of sediment was obtained according to the above-mentioned way.

As can be seen from the said analytical data and the said result of sensory evaluation test by a panel comprising 14 skilled persons, the present soy sauce in Example 4 has the excellent quality equal to that of the conventional soy sauce.

EXAMPLE 5

To 1,260 kg of wheat bran was sprayed with 950l of water and then the resultant was subjected to steaming for 20 minutes at a pressure of 2 kg/cm² (gauge pressure), Subsequently, the seed of Aspergillus sojae 1-190 (FERM-P No. 505, ATCC 20388) was inoculated to the steamed medium and the culturing was conducted at 30°C for 60 hours to obtain koji. The enzymes in the koji was extracted with water in the usual way.

To 2,300l of the thus obtained extract was added 6,000l of cold ethyl alcohol (5°C) and the resultant mixture was allowed to stand over night to form precipitate. The formed precipitate was collected, lyophilized and crushed to obtain 60 kg of a crude enzymatic preparation.

The activity of each enzyme per mg of the thus obtained crude enzymatic preparation was as follows: Pase; 30.5 units, APase; 0.0036 unit, Aase; 102 units and CMCase; 0.110 unit.

To each two mixtures (A) and (B) which had been prepared in advance in the manner shown below was added an enzymatic solution obtained by dissolving 20 kg of the said crude enzymatic preparation to 180 l of water [but (B) was not added] and adding 340 l of 31.72 % aqueous sodium chloride solution, respectively, to incubate at 27°C. The activity of each enzyme added to the raw material was as follows: Pase; 9,170 units per gram of crude protein, APase; 1.07 units per gram of crude protein, Aase; 33,400 units per gram of starch and CMCase; 268 units per gram of crude cellulose.

months. The incubated mash was pressed to obtain soy sauce having an excellent flavor and palatability.

The test results including the analytical data of the components in soy sauce are shown in Table 15.

The reference soy sauce in Table 15 was obtained by manufacturing koji from a mixture of 92 kg of puffed soy bean and 93 kg of parched and crushed wheat in the usual way, adding 380 l of 25.5 % aqueous sodium chloride solution to the thus obtained Koji (250 kg), and incubating the resultant mixture to subject to enzymatic action, fermentation and aging in the same manner as mentioned above.

Table 15

|  | Sodium chloride (%) | Total nitrogen (%) | Formol nitrogen (%) | Amino nitrogen (%) | Ammonium nitrogen (%) |  |  |
|---|---|---|---|---|---|---|---|
| Present (A) soy | 17.10 | 1.807 | 0.876 | 0.763 | 0.113 |  |  |
| sauce (B) | 17.15 | 1.798 | 0.908 | 0.786 | 0.122 |  |  |
| Reference soy sauce | 16.70 | 1.956 | 1.206 | 0.888 | 0.318 |  |  |
|  | Total acids | Reducing sugars (%) | Alcohol (%) | Glutamic acid (%) | Color (No.) | pH |  |
| Present (A) soy | 2.18 | 3.08 | 1.72 | 1.254 | 620 | 5.00 |  |
| sauce (B) | 2.05 | 4.14 | 2.09 | 1.171 | 620 | 5.19 |  |
| Reference soy sauce | 2.58 | 3.62 | 1.35 | 1.510 | 500 | 4.90 |  |
| Mash | raw soy viscosity (cP) | Rate of Wt. of sauce pressed (%) | Wt. of sediment (mg/100 ml) | Nitrogen pressed residue (g/100ml) | Turbidity utility (%) | (O.D.) |  |
| Present (A) soy | 1,500 | 94.2 | 42 | 7.45 | 90.5 | 0.029 |  |
| sauce (B) | 1,700 | 90.0 | 1,602 | 8.99 | 88.7 | 0.030 |  |
| Reference soy sauce | 2,700 | 89.5 | 19 | 9.46 | 89.1 | 0.035 |  |

Preparation method of mixture (A)

To 120 kg of puffed defatted soy bean meal prepared by contacting 126 kg of defatted soy bean meal (crude protein: 47.8 %, starch: 9.6 %, crude cellulose: 5.1 % and water content: 10.4 %) with over-heated steam having a temperature of 164°C and a pressure of 6 kg/cm$^2$ (gauge pressure) for 5 seconds and throwing out the resultant quickly into the air, were added 60 kg of denatured wheat obtained by parching 66 kg of wheat (crude protein: 10.5 %, starch: 74.1 %, crude cellulose: 2.7 % and water content: 10.8 %) and crushing the parched wheat (In this mixture, 66.5 kg of crude protein, 61.0 kg of starch and 8.2 kg of crude cellulose were contained in the total).

Preparation method of mixture (B)

To the flash autoclaved defatted soy bean prepared by spraying 180 l of water to 126 kg of defatted soy bean (crude protein 47.8 %, starch: 9.6 % crude cellulose: 5.1 % and water content: 10.4 %), steaming the resultant at a pressure of 2 kg/cm$^2$ (gauge pressure) for 5 minutes were added 60 kg of denatured wheat prepared by parching 66 kg of wheat (crude protein: 10.5 %, starch, 74.1 %, crude cellulose: 2.7 % and water content: 10.8 %) and crushing the parched wheat.

Twenty days after the beginning of incubation, 2 l of the cultured broth of soy sauce yeast, "Saccharomyces rouxii m.3 (ATCC 13356)", was added to the culture medium and the incubation was continued to subject to enzymatic action, fermentation and aging for further 4

As can be seen from the results of the analysis and the sensory evaluation test according to a panel comprising 14 skilled persons, it is recognized that the present soy sauce in Example 5 has an excellent quality equal to that of the conventional soy sauce.

EXAMPLE 6

To each 0.95 kg of puffed defatted soy bean obtained by contacting 1 kg of defatted soy bean (crude protein: 48.2 %, starch: 9.2 %, crude cellulose: 6.0 % and water content: 10.6 %) with over-heated steam having a temperature of 164°C and a pressure of 6 kg/cm$^2$ (gauge pressure) for 5 seconds and throwing out the resultant quickly into the air, was added the given amount of denatured wheat obtained by parching wheat (crude protein: 10.9 %, starch: 65.7 %, crude cellulose: 1.8 % and water content: 9.7 %) and crushing the parched one in the usual way so as to make the ratio of wheat weight to defatted soy bean weight before denaturing to the levels shown in Tables 16-1 and 16-2, respectively, and there was added an enzymatic solution prepared by dissolving 150 g of a crude enzymatic preparation (whose enzymatic activities per mg of the crude enzymatic preparation were as follows: Pase; 31.0 units, APase; 0.0186 unit, Aase; 192 units and CMCase; 0.755 unit) obtained from Aspergillus oryzae 460 (FERM-P No. 1149, ATCC 20386) cultured in the same manner as mentioned in Example 4 into 4.2 l of water and adding 0.84 kg of sodium chloride thereto. The incubation was conducted at 30°C. Twenty days after incubation, 3 ml of the cultured broth of soy sauce yeast, "Saccharomyces rouxii m.3 (ATCC 13356)" was added. The incubation was continued to subject to enzymatic action, fermentation and aging for further 2 months and the filtration of the resultant was conducted to obtain the filtrates.

The weights of the employed enzymatic preparations were constant as stated before, and enough to meet the requirements. For example, in the case that the ratio of wheat weight to defatted soy bean weight was 1.0, in which the activity of each added enzyme became the lowest, the activity of each enzyme was as follows: Pase; 6,720 units per gram of crude protein, APase; 4.04 units per gram of crude protein, Aase; 34,400 units per gram of starch and CMCase; 1,450 units per gram of crude cellulose.

The test results including the analytical data of the components in the filtrates, the mash viscosity and the results of an sensory evaluation test are given in Tables 16-1 and 16-2.

Table 16-1

| Wt. of wheat / Wt. of defatted soy bean | Sodium chloride (%) | Total nitrogen (%) | Formol nitrogen (%) | Amino nitrogen (%) | Ammonium nitrogen (%) | Total acids | Reducing sugars (%) |
|---|---|---|---|---|---|---|---|
| 1 | 15.05 | 1.883 | 0.883 | 0.744 | 0.139 | 2.10 | 7.72 |
| 0.9 | 15.15 | 1.876 | 0.897 | 0.760 | 0.137 | 2.12 | 6.75 |
| 0.8 | 15.35 | 1.870 | 0.918 | 0.780 | 0.138 | 2.15 | 4.88 |
| 0.7 | 15.40 | 1.851 | 0.902 | 0.780 | 0.122 | 2.13 | 4.56 |
| 0.6 | 15.60 | 1.827 | 0.893 | 0.776 | 0.117 | 1.95 | 3.97 |
| 0.5 | 15.60 | 1.778 | 0.900 | 0.786 | 0.114 | 1.93 | 4.31 |
| 0.4 | 15.85 | 1.771 | 0.896 | 0.785 | 0.111 | 1.85 | 2.42 |
| 0.3 | 16.30 | 1.805 | 0.900 | 0.795 | 0.105 | 1.83 | 2.13 |
| 0.2 | 16.30 | 1.710 | 0.876 | 0.781 | 0.095 | 1.70 | 2.05 |
| 0.1 | 16.50 | 1.698 | 0.876 | 0.785 | 0.091 | 1.65 | 1.72 |
| 0 | 16.52 | 1.672 | 0.861 | 0.775 | 0.086 | 1.52 | 0.50 |

Table 16-2

| Wt. of wheat / Wt. of defatted soy bean | Alcohol (%) | Glutamic acid (%) | Color (No.) | pH | Mash viscosity (cP) | Sensory evaluation test | Nitrogen utility (%) |
|---|---|---|---|---|---|---|---|
| 1 | 1.95 | 1.192 | 430 | 5.18 | 2,000 | + | 86.5 |
| 0.9 | 1.97 | 1.202 | 430 | 5.18 | 1,800 | + | 87.3 |
| 0.8 | 1.92 | 1.217 | 400 | 5.19 | 1,000 | ++ | 91.1 |
| 0.7 | 2.11 | 1.221 | 340 | 5.21 | 900 | ++ | 88.6 |
| 0.6 | 2.26 | 1.224 | 310 | 5.22 | 830 | ++ | 88.4 |
| 0.5 | 1.93 | 1.249 | 310 | 5.21 | 650 | +++ | 90.7 |
| 0.4 | 1.96 | 1.279 | 270 | 5.30 | 500 | +++ | 90.6 |
| 0.3 | 1.52 | 1.229 | 270 | 5.25 | 480 | ++ | 90.4 |
| 0.2 | 1.51 | 1.199 | 230 | 5.32 | 420 | ++ | 90.1 |
| 0.1 | 0.98 | 1.184 | 230 | 5.34 | 380 | + | 90.1 |
| 0 | 0.20 | 1.182 | 195 | 5.38 | 300 | + | 88.5 |

Notes:
(1) In the column of sensory evaluation test, + denotes that the flavor and palatability are normal, ++ denotes that they are excellent and +++ denotes that they are extremely excellent.
(2) The sensory evaluation test was conducted by a panel comprising 10 skilled persons.

As is clear from Tables 16-1 and 16-2, it is recognized that there can be obtained a mash having an excellent quality and soy sauce having an excellent quality when the raw materials are used in a ratio of amyloidal raw materials to proteinous raw materials being within a range of 0.2–0.8, preferably 0.4–0.5.

What is claimed is:

1. A process for manufacturing soy sauce which comprises mixing denatured proteinous and denatured amyloidal raw materials for soy sauce in a ratio of 0.2 to 0.8 part by weight of amyloidal raw material to 1 part by weight of proteinous raw material before denaturing, an enzymatic preparation or a mixture of enzymatic preparations comprising proteinase, aminopeptidase, $\alpha$-amylase and carboxymethylcellulase in the rate of 3,000 units or more per gram of crude protein of raw materials, 0.8 unit or more per gram of crude protein of raw materials, 4,000 units or more per gram of starch of raw materials and 60 units or more per gram of crude cellulose of raw materials, respectively, and aqueous sodium chloride solution, the concentration of the aqueous sodium chloride solution being such that the concentration of sodium chloride in the fermented soy sauce is 13–20%, and incubating the resultant mixture for 3 to 6 months whereby said mixture is subjected to enzymatic action, fermentation and aging.

2. A process according to claim 1, wherein the proteinase, aminopeptidase, $\alpha$-amylase and carboxymethylcellulase are employed at the rate of 6,000 units or more per gram of crude protein, 2.0 units or more per gram of crude protein, 8,000 units or more per gram of starch and 140 units or more per gram of crude cellulose.

3. A process according to claim 1, wherein the enzymatic preparation or the mixture of enzymatic preparations is a crude enzymatic preparation obtained from a microorganism comprising a yellow-green Aspergillus belonging to at least one species selected from the group consisting of Aspergillus oryzae, Aspergillus sojae, Aspergillus flavus, Aspergillus parsiticus, Aspergillus tamarii, Aspergillus clavato-flavus, Aspergillus zonatus, Aspergillus flavo-furcatis, Aspergillus subolivaceus, and Aspergillus avenaceus.

4. A process according to claim 3, wherein the yellow-green Aspergillus is one strain selected from the group consisting of Aspergillus oryzae 460 (FERM-P No. 1149, ATCC 20386), Aspergillus oryzae IAM 2616, Aspergillus sojae 1-112 (FERM-P No. 504, ATCC 20387), Aspergillus sojae 1-190 (FERM-P No. 505, ATCC 20388), Aspergillus flavus IFO 5324, Aspergillus parasiticus IFO 4204, and Aspergillus tamarii IFO 4359.

5. A process according to claim 3 wherein the microorganism is one belonging to the species Aspergillus oryzae or Aspergillus sojae.

6. A process according to claim 3, wherein the crude enzymatic preparation is added so as to make the activities of the proteinase, aminopeptidase, $\alpha$-amylase and carboxymethylcellulase contained therein 3,000 units or more per gram of crude protein, 0.8 unit or more per gram of crude protein, 4,000 units or more per gram of starch and 60 units or more per gram of crude cellulose, respectively.

7. A process according to claim 3, wherein the crude enzymatic preparation is obtained from the yellow-green Aspergilli cultured in a solid medium.

8. A process according to claim 7, wherein the yellow-green Aspergillus is cultured at a temperature of 25°–40°C for 40–60 hours in the medium obtained by spraying 70 –100 % by weight of water to bran and subjecting to autoclaving at a pressure of 0–2 kg/cm$^2$ (gauge pressure).

9. A process according to claim 8, wherein at least one member selected from the group consisting of sodium nitrate, calcium nitrate, disodium phosphate and urea is added to the medium.

10. A process according to claim 8, wherein soy bean, rice bran and/or rape cake are added to the medium.

11. A process according to claim 7, wherein the crude enzymatic preparation obtained from the yellow-green Aspergilli is the one collected by alcohol precipitation method or ultrafiltration method.

12. A process according to claim 1, wherein the proteinous raw materials for soy sauce is denatured by subjecting the raw materials to puffing treatment or alcohol modification.

13. A process according to claim 1, wherein the incubation is carried out at a temperature of 20°–40°C for 3–6 months.

14. A process according to claim 13, wherein the incubation is carried out with daily stirring from 3 to 7 days after the beginning of incubation and weekly stirring thereafter.

15. A process according to claim 13, wherein the incubation is carried out by adding a soy sauce yeast, Saccharomyces rouxii m.3 (ATCC 13356), 20 to 40 days after the beginning of incubation.

16. A process according to claim 1, wherein the incubation is carried out by adding a soy sauce lactic acid bacterium, Tetracoccus sojae (FERM-P No. 1401, ATCC 21787) or Pediococcus halophilus (FERM-P No. 1414, ATCC 21786).

17. A process according to claim 1, wherein the aqueous sodium chloride solution is added in such a quantity that the volume of the solution is 2–5 times the weight of the raw materials for soy sauce before denaturing.

* * * * *